Sept. 4, 1962  H. G. CHINN ET AL  3,052,565
INTERMITTENT RESIN MELT APPLICATION
Filed June 30, 1958  2 Sheets-Sheet 1

INVENTORS
HYMAN G. CHINN
HAROLD M. SHAPPELL
BY Walter C. Kehm
ATTORNEY

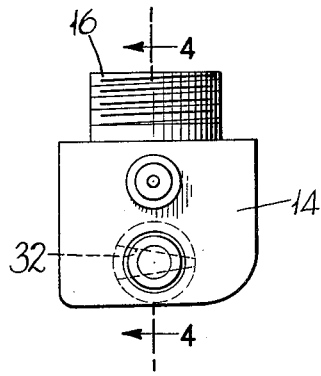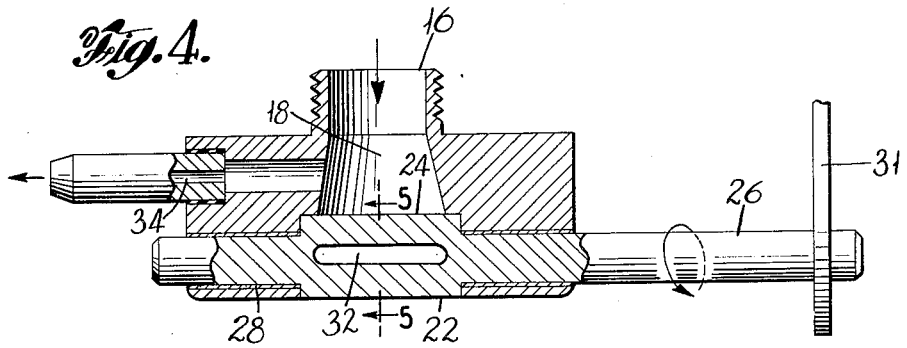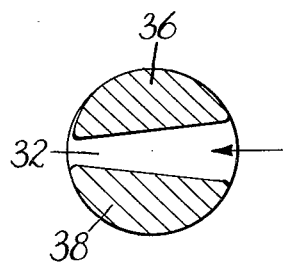

United States Patent Office 3,052,565
Patented Sept. 4, 1962

3,052,565
INTERMITTENT RESIN MELT APPLICATION
Hyman G. Chinn, Somerville, and Harold M. Shappell, Bound Brook, N.J., assignors to Union Carbide Corporation, a corporation of New York
Filed June 30, 1958, Ser. No. 745,347
4 Claims. (Cl. 117—37)

This invention relates to the application of thermoplastics to sheet material and more particularly, to the intermittent application of thermoplastic melts to preselected areas of sheet material.

The use of thermoplastics as adhesives has heretofore been restricted by the absence in the art of a suitable means for applying the thermoplastic to the surfaces to be bonded. Thus, although thermoplastics are superior in many respects to conventional adhesives, particularly in the moisture-tightness of the bond produced, thermoplastics have not been extensively used in many bonding applications wherein their superior properties would be of great value. Presently known methods of applying conventional adhesives are not suitable for applying thermoplastics which generally are susceptible to degradation at high temperatures and which, in some instances, do not flow easily even at high temperatures. One of the most desirable thermoplastics is polyethylene, except that it degrades unduly if exposed to the atmosphere at elevated temperatures. Also, polyethylene, does not soften enough to flow easily even at temperatures in the range of 300–500° C., especially those polymers having molecular weights above about 16,000. Known adhesive application techniques such as the fountain roller require a low viscosity adhesive so that the fountain wheel can pick up adequate amounts of the adhesive, transfer it efficiently to the applicator wheel which then applies it to the sheet material surface. It is readily apparent that the degree of exposure of the adhesive inherent in fountain roller techniques, combined with the high temperatures required to maintain the adhesive in a liquid state, are extremely detrimental to a thermoplastic such as polyethylene.

Known methods for applying adhesive are even less suited for intermittent adhesive application. Where it is desired to apply limited quantities of adhesive to a definite well-defined area, such as in the applying of adhesive to end-flaps of box-like containers, the viscous nature of most thermoplastics prevents adhesive applications having an even depth and controlled dimensions. Erratic bonding is the result.

It is, therefore, an object of our invention to provide a method and apparatus for applying thermoplastic melt to sheet material surfaces wherein the disadvantages of prior methods and apparatus are avoided.

It is another object of our invention to provide a method and apparatus for intermittently applying controlled amounts of thermoplastic melt to pre-selected areas of sheet material wherein the thermoplastic does not undergo thermal or oxidative degradation.

A more particular object of our invention is to provide a method and apparatus for intermittently applying uniformly even depths of thermoplastic melt exactly over preselected areas.

Accordingly, our method and apparatus provide for the intermittent application of controllable amounts of thermoplastic melt to pre-selected areas of sheet material wherein thermoplastic melt is fed intermittently from a completely enclosed reservoir onto pre-selected areas of sheet material in such a manner that thermoplastic melt not actually fed onto the sheet material does not come into contact with the surrounding atmosphere.

The method and apparatus of our invention are particularly advantageous in that: the thermoplastic melt is not exposed to the atmosphere and hence not physically degraded; the application of the thermoplastic melt is simple, convenient and more economical because precisely controlled amounts of thermoplastic melt can be placed on exactly the desired areas of sheet material; increased speed of thermoplastic application is possible with no sacrifice in the control of the dimensions or thickness of the applied thermoplastic; adaptation to rapidly moving production lines is easily accomplished; and strong, moisture-tight seals are achieved even with pre-coated sheet material surfaces which have heretofore been difficult to seal adequately. To provide a more complete understanding of the method and apparatus of our invention an embodiment thereof is described below in connection with the attached drawings in which:

FIGURE 3 is a side elevation of the die shown in FIGURE 1.

FIGURE 4 is a vertical section taken along line 4—4 of FIGURE 3.

FIGURE 5 is a vertical section taken along line 5—5 of FIGURE 4.

Figure 1:
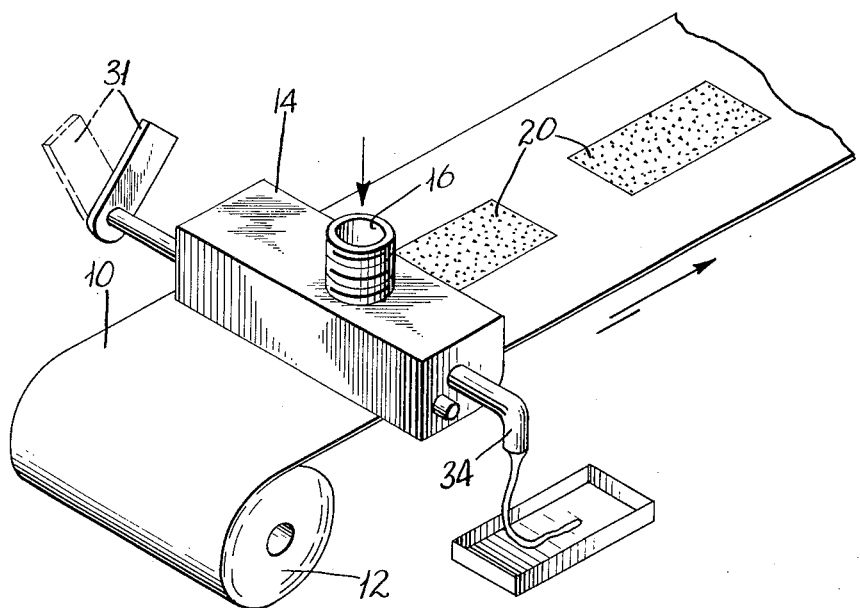
FIGURE 1 is a diagrammatic isometric view of one embodiment of the apparatus according to and for carrying out the method of the present invention.

Referring now to the drawings in detail, FIGURE 1 shows sheet material 10 drawn from a supply roll 12 traveling at a constant rate of speed past a die 14 which is attached to the nozzle of an extruder or pump, not shown, at die inlet 16. As most clearly shown in FIGURE 4, thermoplastic entering the die inlet 16 flows into an enclosed reservoir chamber 18 wherein it is kept at a constant pressure. The thermoplastic in the enclosed reservoir chamber 18 is fed onto the traveling sheet material 10 to form discrete patches of thermoplastic 20 through a die outlet 22 shown most clearly in FIGURE 4, with which the traveling sheet material 10 is in moving contact. The passage between the enclosed reservoir chamber outlet 24 and the die outlet 22 is blocked with the spindle 26, journaled in the sleeve 28. The thermoplastic is permitted to traverse the passage between the reservoir outlet 24 and the die outlet 22 by rotating the spindle 26 by means of a lever 31 to align the slot 32 simultaneously with the reservoir chamber outlet 24 and the die outlet 22. The feeding of thermoplastic from the enclosed reservoir chamber 18 through the slot 32 is interrupted by rotating the spindle 26 to the closed position thereby misaligning the slot 32 from the reservoir chamber outlet 24 and the die outlet 22. The closed position is most clearly shown in FIGURE 3. While the spindle 26 is in the closed position even though resin is continuously extruded into the enclosed reservoir chamber 18, an undue amount of pressure does not build up because of the presence of an escape port 34 through which excess resin is forced out of the enclosed reservoir chamber 18 in the manner shown in FIGURE 1. The resistance to flow of thermoplastic through the escape port 34 is at least slightly greater than that through the slot 32 so that when the slot 32 is aligned with the reservoir chamber 18 thermoplastic flows exclusively through the slot 32. However, when the spindle 26 is rotated to the closed position, as in FIGURE 1, the resin in the reservoir chamber 18 is maintained at a constant pressure due to the escape of any excess resin through the escape port 34. The maintaining of constant pressures within the reservoir chamber insures a uniform feed of thermoplastic upon realigning the slot 32 with the chamber outlet 24 and the die outlet 22. Without the escape port, the build-up of pressure would cause a surge of thermoplastic from the die outlet 22 upon realigning the slot 32 and cause an unevenness in the thickness and dimensions of the thermoplastic applied. A detail of the slot 32 showing the taper thereof and slot walls 36 and 38 is given in FIGURE 5. Wall 36 is lesser in cross-section than wall 38 and the bottom portion thereof is rounded to permit a more exact cut-off of resin flow from the die outlet 22. Thus sharply defined, discrete patches of resin of uniform thickness such as shown in FIGURE 1 can be applied with a minimum of difficulty. The actual thickness and the dimensions of the patch of resin 20 are dependent primarily upon the rate of speed at which the sheet material 10 is moving past the die outlet 22, the pressure in the enclosed reservoir chamber 18 and the dimensions of the slot 32. These variables permit a wide variety of shapes and sizes of thermoplastic patches, which can be applied intermittently at regular or irregular intervals or uninterruptedly, if desired.

Figure 2:
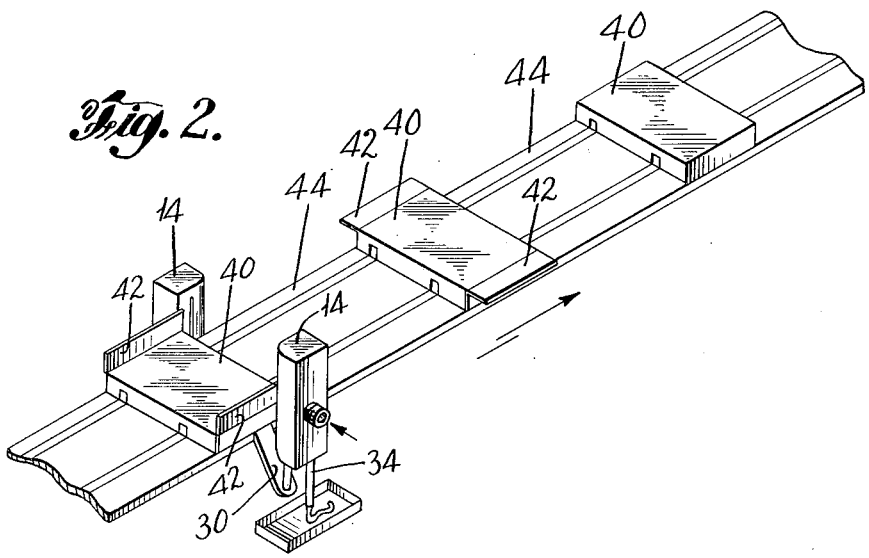
FIGURE 2 is a diagrammatic isometric view of another embodiment of the apparatus according to and for carrying out the method of the present invention.

A technique to which the method of our invention is particularly adapted is the applying of resin bonding compositions to the end-flaps of boxes in a production line. As shown in FIGURE 2, boxes 40 with end-flaps 42 positioned for receiving resin are moved past a pair of dies 14 located on either side of a moving belt 44 carrying the boxes. As the flaps 42 come in contact with the die outlets 22, the cam 30 is actuated automatically whereby the spindle is rotated to the open position permitting resin to pass from the enclosed reservoir chamber 18 through the slot 32 aligned with the reservoir chamber outlet 24 and the die outlet 22 onto the flaps of the boxes 40 moving therepast at a constant rate. The end-flaps 42 after receiving a patch of thermoplastic melt of sufficient thickness over their entire outwardly facing surface to assure a good, strong, moisture tight seal, are folded down and pressed against the body of the box 40 and sealed thereto as the thermoplastic hardens. After the passage of the up-raised flaps 42 past the die outlets 22 the cam 30 is actuated to rotate the spindle 26 to the closed position thereby misaligning the slot 32. Prevention of undue pressure build-up which would cause a surge of thermoplastic on the succeeding box flap, is assured by the presence of the escape port 34 through which excess thermoplastic flows. The excess is collected and may be reused, thereby eliminating waste and messiness on the production line. The procedure is repeated automatically for each box which passes the dies.

It is obvious from the foregoing that our method and apparatus can be used to apply virtually any material which can be extruded or pumped to sheet material surfaces either plane or curvilinear in well-defined discrete portions of even thickness with perfect reproducibility.

What is claimed is:

1. Apparatus for intermittently applying thermoplastic melt to sheet material comprising means for continuously supplying thermoplastic melt, a die communicating with said means into which said thermoplastic melt is continuously introduced, a completely enclosed chamber in said die for containing said thermoplastic melt and maintaining said thermoplastic melt out of contact with air, a barrel in said die provided with an inlet adjacent said chamber and an outlet remote to said chamber and a passage therebetween, a spindle journaled in said barrel and extending transversely to said passage, said spindle having an opening adapted to align with said passage in one position and adapted to be misaligned with said passage by rotation of said spindle to an angularly displaced position, an escape port leading from said chamber offering a greater resistance to flow therethrough of thermoplastic melt contained in said chamber than said passage whereby thermoplastic melt continuously introduced into said chamber builds up a certain pressure, which pressure is thereafter maintained at a constant level by the escape of excess thermoplastic melt through said escape port, said presure at all times being sufficient to force thermoplastic melt contained in said chamber through said passage when the opening in said spindle is intermittently aligned with said passage.

2. Apparatus claimed in claim 1 wherein the means for continuously supplying thermoplastic melt is an extruder and the opening in said spindle is a slot adapted to register with both the inlet and outlet of said barrel.

3. Apparatus claimed in claim 2 wherein the slot in said spindle is tapered and has a wider portion adapted to register with the inlet of said barrel and a narrower portion adapted to register with the outlet of said barrel.

4. Method for the intermittent application of controllable amounts of thermoplastic melt to pre-selected areas of sheet material comprising the steps of continuously introducing thermoplastic melt into a completely enclosed reservoir, maintaining said thermoplastic melt out of contact with air, continuously increasing the pressure within the reservoir by the introduction of said thermoplastic melt up to a predetermined value, continuously relieving through a channel leading from the reservoir pressures in excess of said predetermined value by removing from said reservoir through said channel any thermoplastic melt maintained at pressures in excess of said predetermined value in said reservoir; moving sheet material along a predetermined path, intermittently discharging thermoplastic melt under a pressure equal to said predetermined value from said reservoir through an opening adjacent said sheet material, and smearing the thermoplastic melt onto pre-selected areas of said sheet material.

References Cited in the file of this patent

UNITED STATES PATENTS

| | | |
|---|---|---|
| 704,942 | Smith | July 15, 1902 |
| 1,260,558 | Legler | Mar. 26, 1918 |
| 1,384,290 | Winchenbaugh et al. | July 12, 1921 |
| 2,042,536 | Leguillen | June 2, 1936 |
| 2,478,599 | Spanel | Aug. 9, 1949 |
| 2,556,550 | Murray | June 12, 1951 |
| 2,609,306 | Pascotti | Sept. 2, 1952 |
| 2,651,586 | Cooper et al. | Sept. 8, 1953 |
| 2,703,764 | Vogt | Mar. 8, 1955 |
| 2,708,096 | Mueller | May 10, 1955 |
| 2,725,033 | Pulford | Nov. 29, 1955 |